United States Patent
Ledebohm et al.

(10) Patent No.: US 7,535,433 B2
(45) Date of Patent: May 19, 2009

(54) DYNAMIC MULTIPLE DISPLAY CONFIGURATION

(75) Inventors: Herbert O. Ledebohm, Georgetown, TX (US); Todd Michael Poynter, San Jose, CA (US); Shail Dave, San Jose, CA (US); Mark A. Einkauf, Austin, TX (US); Kevin J. Kranzusch, Campbell, CA (US)

(73) Assignee: NVIDIA Corporation, Santa Clara, CA (US)

( * ) Notice: Subject to any disclaimer, the term of this patent is extended or adjusted under 35 U.S.C. 154(b) by 106 days.

(21) Appl. No.: 11/419,126

(22) Filed: May 18, 2006

(65) Prior Publication Data

US 2007/0268296 A1    Nov. 22, 2007

(51) Int. Cl.
*G09G 5/00* (2006.01)
*G06F 15/00* (2006.01)
*G06T 1/00* (2006.01)
*G06F 15/16* (2006.01)
*G06F 3/00* (2006.01)
*G06F 9/44* (2006.01)
*G06F 9/46* (2006.01)
*G06F 13/00* (2006.01)

(52) U.S. Cl. ................ 345/1.1; 345/501; 345/502; 719/323; 719/327

(58) Field of Classification Search ............ 345/502, 345/505, 1.1; 719/323, 327
See application file for complete search history.

(56) References Cited

U.S. PATENT DOCUMENTS

| 6,104,359 | A | * | 8/2000 | Endres et al. | 345/589 |
| 6,105,050 | A | * | 8/2000 | Govindaraju et al. | 718/102 |
| 6,473,086 | B1 | * | 10/2002 | Morein et al. | 345/505 |
| 6,859,219 | B1 | * | 2/2005 | Sall | 345/1.1 |
| 2005/0076184 | A1 | * | 4/2005 | Schumacher | 711/170 |

* cited by examiner

*Primary Examiner*—Kee M Tung
*Assistant Examiner*—Jacinta Crawford
(74) *Attorney, Agent, or Firm*—Patterson & Sheridan, LLP

(57) ABSTRACT

A system and method for modifying the configuration of one or more graphics adapters and one or more displays without rebooting the system allows a user to quickly transition between different graphics adapter/display configurations. A single display driver interfaces between the operating system and the one or more graphics devices. The display driver reconfigures the one or more graphics devices to change the adapter/display configuration without shutting down or rebooting the system. Unlike a conventional system reboot performed by the operating system, the display driver checks that there are no memory leaks or error conditions during the reconfiguration.

20 Claims, 7 Drawing Sheets

DYNAMIC MULTIPLE DISPLAY CONFIGURATION

BACKGROUND OF THE INVENTION

1. Field of the Invention

Embodiments of the present invention generally relate to configuring graphics display devices, and more particularly to configuring the display devices when multiple graphics adapters are installed in a system.

2. Description of the Related Art

Conventional graphics processing systems including one or more graphics adapters typically need to be rebooted to reconfigure the graphics adapters for a different adapter/display configuration. For example, the host computer is rebooted to change from a first adapter/display configuration with a first graphics adapter providing output for a first display and a second graphics adapter providing output for a second display to a second adapter/display configuration with the first graphics adapter and the second graphics adapter configured to provide output for the first display and either the first graphics adapter or the second graphics adapter configured to provide output for the second display. Using two graphics adapters to provide output for a single display is desirable to produce complex images for the single display with improved performance compared with using a single graphics adapter to produce the complex images.

A single display driver may be used to interface between the operating system (OS) running on the host computer and the first graphics device and the second device. Alternatively, a separate display driver may be used to interface between the operating system (OS) running on the host computer and each graphics device. When a user requests to change the adapter/display configuration, the OS initiates a shutdown in order to reconfigure the graphics devices and displays. After the graphics devices and displays are reconfigured, the OS restarts the system. When the system is rebooted, the OS shuts down all of the applications and display driver(s) and restarts the applications and the display driver(s). The reboot requires many clock cycles to complete and is typically avoided by users.

Accordingly, it is desirable to enable a user to change the adapter/display configuration without rebooting the system.

SUMMARY OF THE INVENTION

The current invention involves new systems and methods for dynamically changing the adapter/display configuration. The configuration of one or more graphics adapters and one or more displays is performed without rebooting the system, allowing a user to quickly transition between different graphics adapter/display configurations. A single display driver may interface between the operating system and the one or more graphics adapters. The display driver reconfigures the one or more graphics adapters to change the adapter/display configuration without shutting down the system. Unlike a conventional system shutdown performed by the operating system, the display driver checks that there are no memory leaks or error conditions during the reconfiguration.

Various embodiments of the invention include a first display device, a second display device, a first graphics adapter configured to provide image data to the first display device, a second graphics adapter, and a display driver. The second graphics adapter is configurable to provide image data to the first display device though the first graphics adapter or to provide image data to the second display device. The display driver is configured to change a configuration of the first display device, the second display device, a first graphics adapter, and a second graphics adapter from a first configuration to a second configuration without shutting down the multiple graphics adapter processing system.

Various embodiments of a method of the invention for changing a configuration of a multiple graphics adapter processing system include determining whether a configuration specification enables or disables a scalable link interface between a first graphics adapter and a second graphics adapter in the multiple graphics adapter processing system and changing from a first configuration of the first graphics adapter and the second graphics adapter to a second configuration of the first graphics adapter and the second graphics adapter without shutting down the multiple graphics adapter processing system, wherein the second configuration is defined by the configuration specification.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

A system and method for modifying the configuration of one or more graphics adapters and one or more displays without rebooting the system allows a user to quickly transition between different graphics adapter/display configurations. A single display driver interfaces between the operating system and the one or more graphics adapters. Therefore, unlike a conventional system where there may be a one to one correspondence between display drivers and graphics adapters, an application program does not need to communicate with multiple display drivers to distribute processing to the multiple graphics adapters. Furthermore, a unified frame buffer may be presented to the application program when the frame buffer is distributed between the multiple graphics adapters. The display driver reconfigures the one or more graphics adapters to change the adapter/display configuration without shutting down or rebooting the system. Unlike a conventional system reboot performed by the operating system, the display driver checks that there are no memory leaks or error conditions during the reconfiguration. As known to those skilled in the art, a memory leak is a condition in which memory that has been allocated, but is no longer needed, is not properly freed. As new memory is allocated, the unfreed memory is the "leak" and eventually this condition may cause "out of memory" errors and/or system crashes.

Figure 1A:
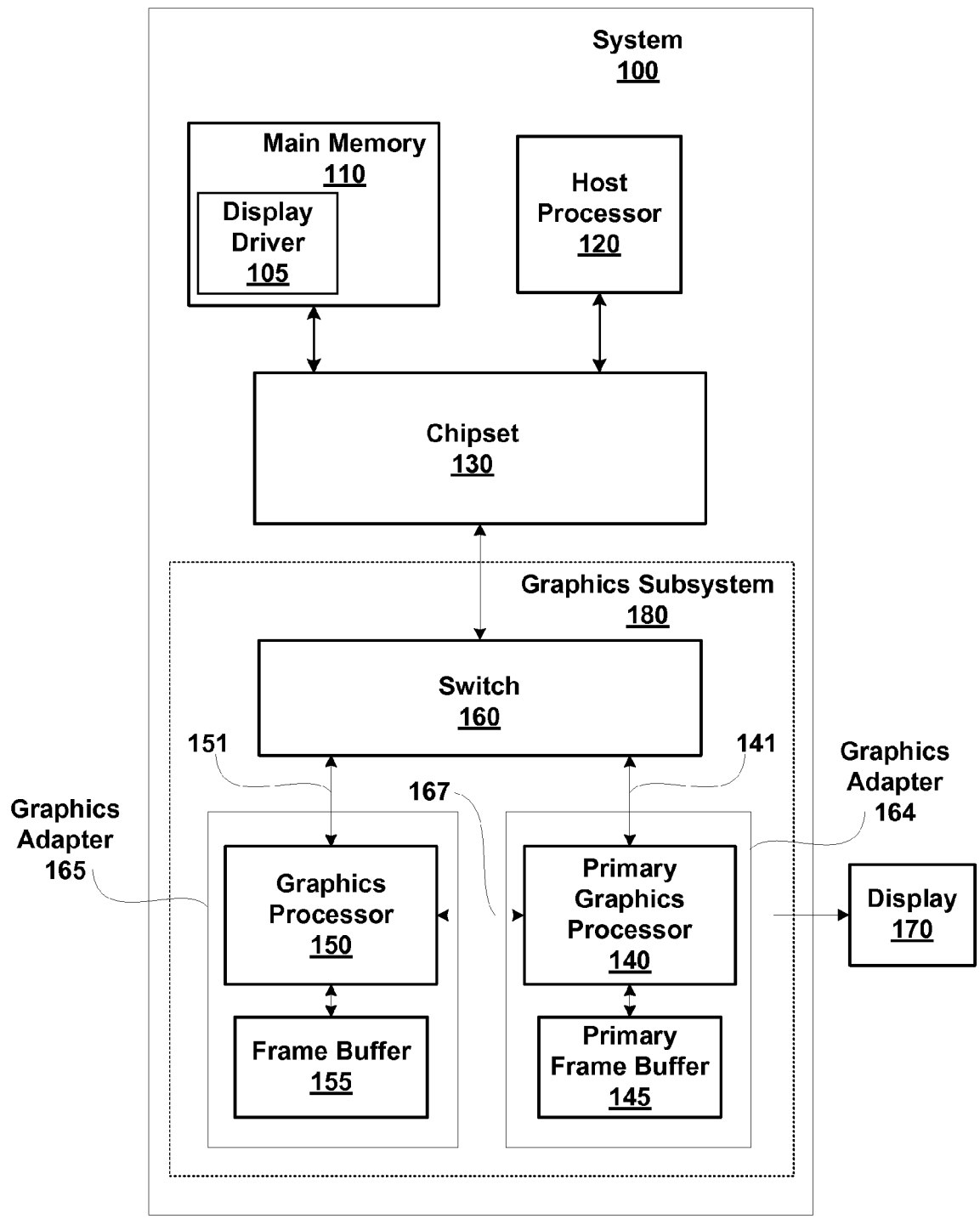
FIG. 1A is a block diagram of an exemplary embodiment of a multiple graphics adapter processing system in accordance with one or more aspects of the present invention.

FIG. 1A is an exemplary embodiment of a graphics processing system 100 including multiple graphics devices, in accordance with one or more aspects of the present invention. System 100 may be a desktop computer, server, laptop computer, palm-sized computer, tablet computer, game console, cellular telephone, hand-held device, computer based simulator, or the like. System 100 includes a host processor 120, a main memory 110, and a chipset 130 that is directly coupled to a graphics subsystem 180. Graphics subsystem 180 includes a switch 160, and multiple graphics devices, graphics adapter 164 and graphics adapter 165.

A single display driver, display driver 105, stored within main memory 110, configures the devices within graphics subsystem 180 and communicates between applications executed by host processor 120 and graphics adapters 165 and 164. In a conventional graphics processing system running the Windows® OS two display drivers are used, one for each graphics adapter installed in the system.

In some embodiments of system 100, chipset 130 may include a system memory switch and an input/output (I/O) switch that may include several interfaces such as, Advanced Technology Attachment (ATA) bus, Universal Serial Bus (USB), Peripheral component interface (PCI), or the like. Switch 160 provides an interface between chipset 130 and each of graphics adapter 165 and graphics adapter 164 when a first port and a second port of switch 160 are coupled to a connection 151 and a connection 141, respectively. In some embodiments of switch 160, switch 160 provides an indirect interface between graphics adapter 165 and graphics adapter 164 through the combination of connections 151 and 141. Connection 167 provides a direct connection between graphics adapter 165 and graphics adapter 164. In some embodiments of the present invention, connection 167 is omitted. Switch 160 may also include interfaces to other devices.

In some embodiments of the present invention, the functionality provided by switch 160 is integrated into chipset 130 and chipset 130 can interface directly with multiple graphics adapters. In some embodiments the present invention, transfers over connections 141 and 151 are performed using an industry standard protocol such as PCI-Express,™ and, in such cases, switch 160, graphics adapter 165 and graphics adapter 164, each include an interface unit corresponding to the industry standard protocol.

As shown in FIG. 1A, a primary graphics processor 140 within graphics adapter 164 is configured to output image data to a display 170. Display 170 may include one or more display devices, such as a cathode ray tube (CRT), flat panel display, or the like. Primary graphics processor 140 within graphics adapter 164 is also coupled to a primary frame buffer 145, which may be used to store graphics data, image data, and program instructions. A graphics processor 150 within graphics adapter 165 is coupled to a frame buffer 155, which may also be used to store graphics data, image data, and program instructions. In some embodiments of the present invention, graphics adapter 164 includes two or more graphics processors. Graphics adapter 164 and graphics adapter 165 may each be capable of providing image data to two or more displays. As shown in FIG. 1A, graphics processor 150 is configured to output image data to display 170 via primary graphics processor 140.

An example of a multi-adapter configuration is a scalable link interface (SLI) configuration that permits multiple graphics devices to produce and combine image data for a single display device. The SLI configuration functionality is provided via switch 160 or via connection 167. Additional graphics adapters may be included within graphics subsystem 180 and coupled to each other in a chain that is coupled to graphics processor 150, thereby providing the scalable feature of the SLI configuration.

In some embodiments of the present invention, the multi-adapter configuration is fixed when system 100 is manufactured. For example, the multi-adapter configuration information may be fixed by providing hardwired inputs to each graphics processor. In other embodiments of the present invention, the multi-adapter configuration information is dynamic and is updated when a second or additional graphics adapter is installed in system 100 or may be changed by a user via a control panel. The multi-adapter configuration information may include an indication that one of the multiple graphics devices, such as graphics adapter 164 is a primary, e.g., master, graphics device that generates an output to display 170.

Display driver 105 may configure graphics processor 150 and primary graphics processor 140 such that the graphics processing workload performed by system 100 is divided between graphics processor 150 and primary graphics processor 140 to produce the image data. For example, graphics processor 150 may process a larger portion of an image than primary graphics processor 140. In some embodiments of the present invention, graphics processor 150 may process the entire image and primary graphics processor 140 may receive the image data from graphics processor 150 via the SLI. In other embodiments of the present invention, host processor 120 controls the transfer of the image data from graphics processor 150 to primary graphics processor 140.

Although system 100 as shown is a graphics processing system, alternate embodiments of system 100 may process other types of data, such as audio data, multi-media data, or the like. In those alternate embodiments, graphics processor 150 and primary graphics processor 140 would be replaced with other appropriate data processing devices. Likewise, display driver 105 would be replaced with a device driver corresponding to the data processing device.

Figure 1B:
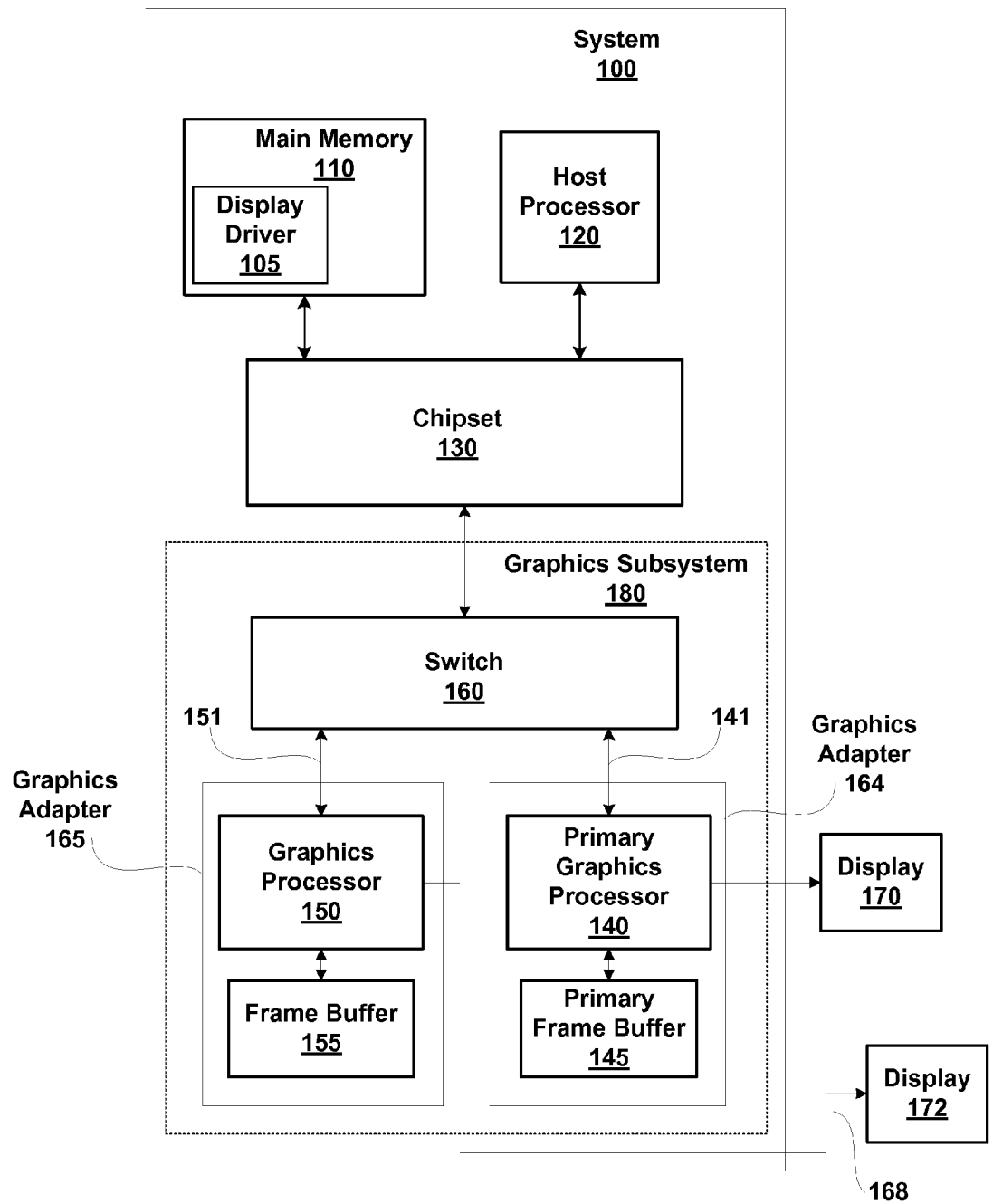
FIGS. 1B and 1C are block diagrams of other configurations of the multiple graphics adapter processing system of FIG. 1A in accordance with one or more aspects of the present invention.

FIG. 1B is block diagram of another configuration of the multiple graphics adapter processing system of FIG. 1A, in accordance with one or more aspects of the present invention. As shown in FIG. 1B, primary graphics processor 140 is configured to provide image data to display 170 and graphics processor 150 is configured to provide image data to a second display device, display 172 through a connection 168. Although connection 167 (see FIG. 1A) may be retained, an SLI connection is not illustrated in the configuration shown in FIG. 1B. Display driver 105 may reconfigure graphics adapter 150 to provide image data directly to display 172 instead of to display 170 via primary graphics processor 140.

The adapter/display configuration shown in FIG. 1A may be used to produce complex or high quality images for viewing on display 170. The adapter/display configuration shown in FIG. 1B may be used to produce lower quality images for viewing on display 170 and display 172. A user may prefer the configuration shown in FIG. 1A to play a game and change to the configuration shown in FIG. 1B to surf the internet or perform text editing tasks. The change in configuration may be initiated when display 172 is connected to graphics adapter 165 via connection 168 or by a user specifying the configuration change using a control panel. In another configuration of system 100 graphics adapter 165 may be omitted, and display driver 105 may initiate a change to the configuration shown in FIG. 1A when graphics adapter 165 is connected to switch 160 and primary graphics processor 140.

Figure 1C:
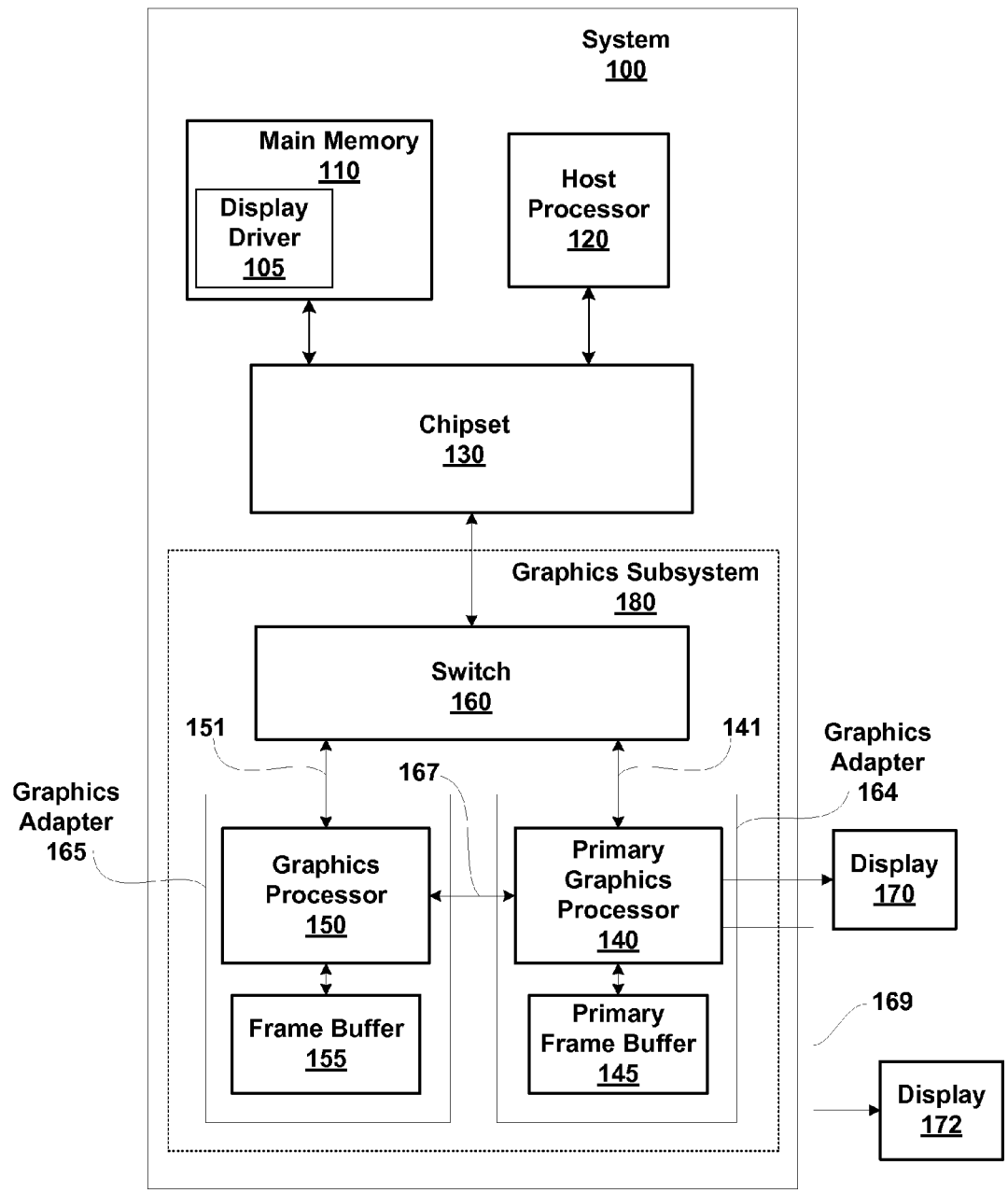

FIG. 1C is block diagram of yet another configuration of the multiple graphics adapter processing system of FIG. 1A, in accordance with one or more aspects of the present invention. As shown in FIG. 1C, primary graphics processor 140 is configured to provide image data to display 170 and to display 172 through a connection 169. Graphics processor 150 is configured to provide image data to a display 170 through an SLI connection provided by connection 167. A change from the adapter/display configuration shown in FIG. 1C to the adapter/display configuration shown in FIG. 1B may be initiated when display 172 is connected to graphics adapter 164 via connection 169 or by a user specifying the configuration change using a control panel. Alternatively, a change from a adapter/display configuration with graphics adapter 164 providing image data to displays 170 and 172 to the adapter/display configuration shown in FIG. 1C may be initiated when connection 167 is added, providing a SLI connection between graphics adapter 165 and graphics adapter 164. Similarly, a change to the adapter/display configuration shown in FIG. 1C may be initiated when graphics adapter 165 is connected to switch 160 and primary graphics processor 140.

Figure 2:
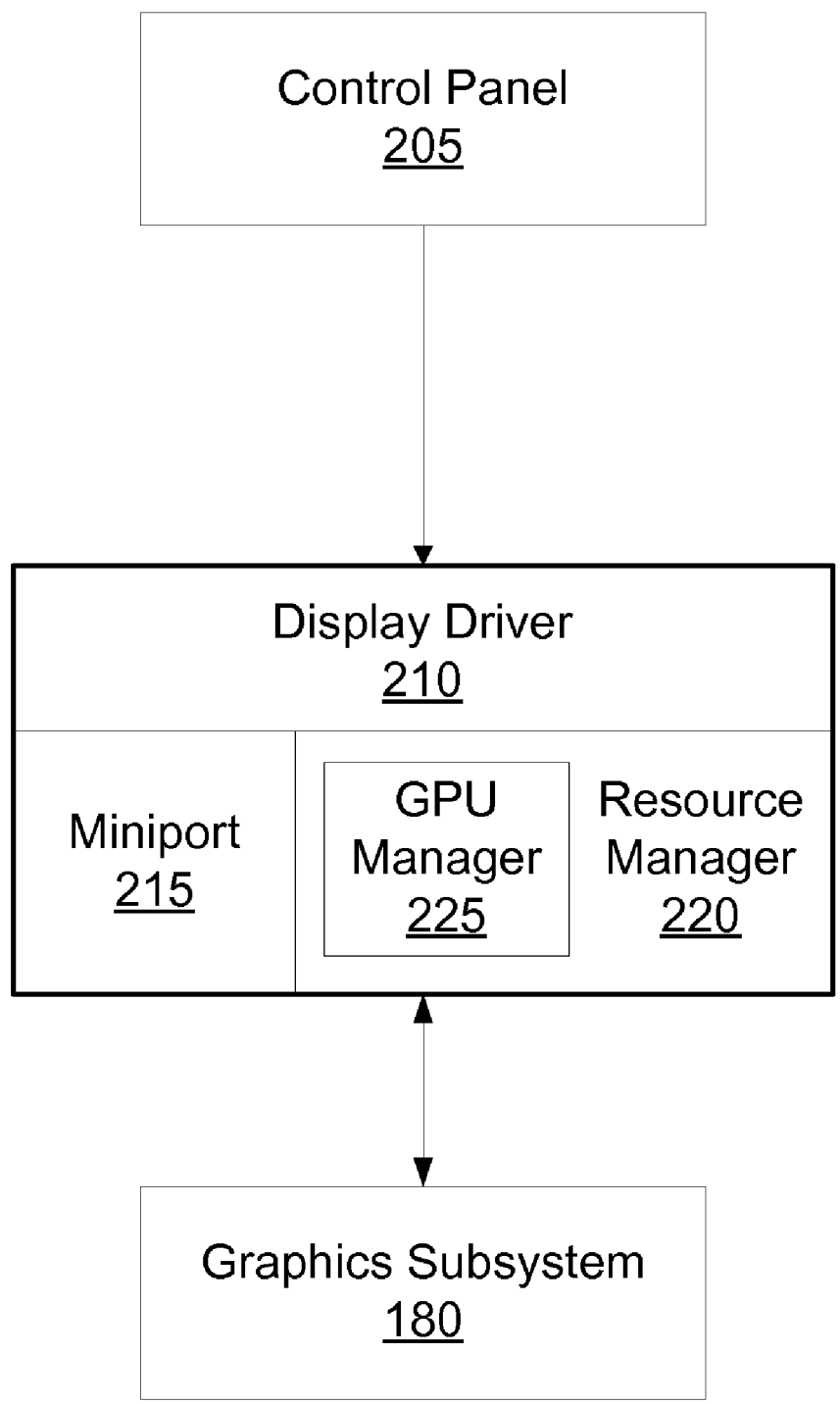
FIG. 2 is a conceptual diagram showing the communication between the control panel, display driver, and graphics subsystem in accordance with one or more aspects of the present invention.

FIG. 2 is an exemplary embodiment of conceptual diagram showing the communication between a control panel 205, display driver 210, and graphics subsystem 180, in accordance with one or more aspects of the present invention. Display driver may receive a configuration specification from control panel 205 or from graphics subsystem 180. The configuration specification defines which graphics adapter(s) provides image data for each display in the multiple graphics adapter system, including whether or not one or more SLI connections are enabled. A user may view the current adapter/display configuration using control panel 205 and specify changes to produce a different adapter/display configuration. Alternatively, changes to the adapter/display configuration may be initiated by adding or removing a display device, graphics adapter, or SLI connection. The configuration specification of the resulting adapter/display configuration is defined by the physical modifications to the multiple graphics adapter system.

Figure 3A:
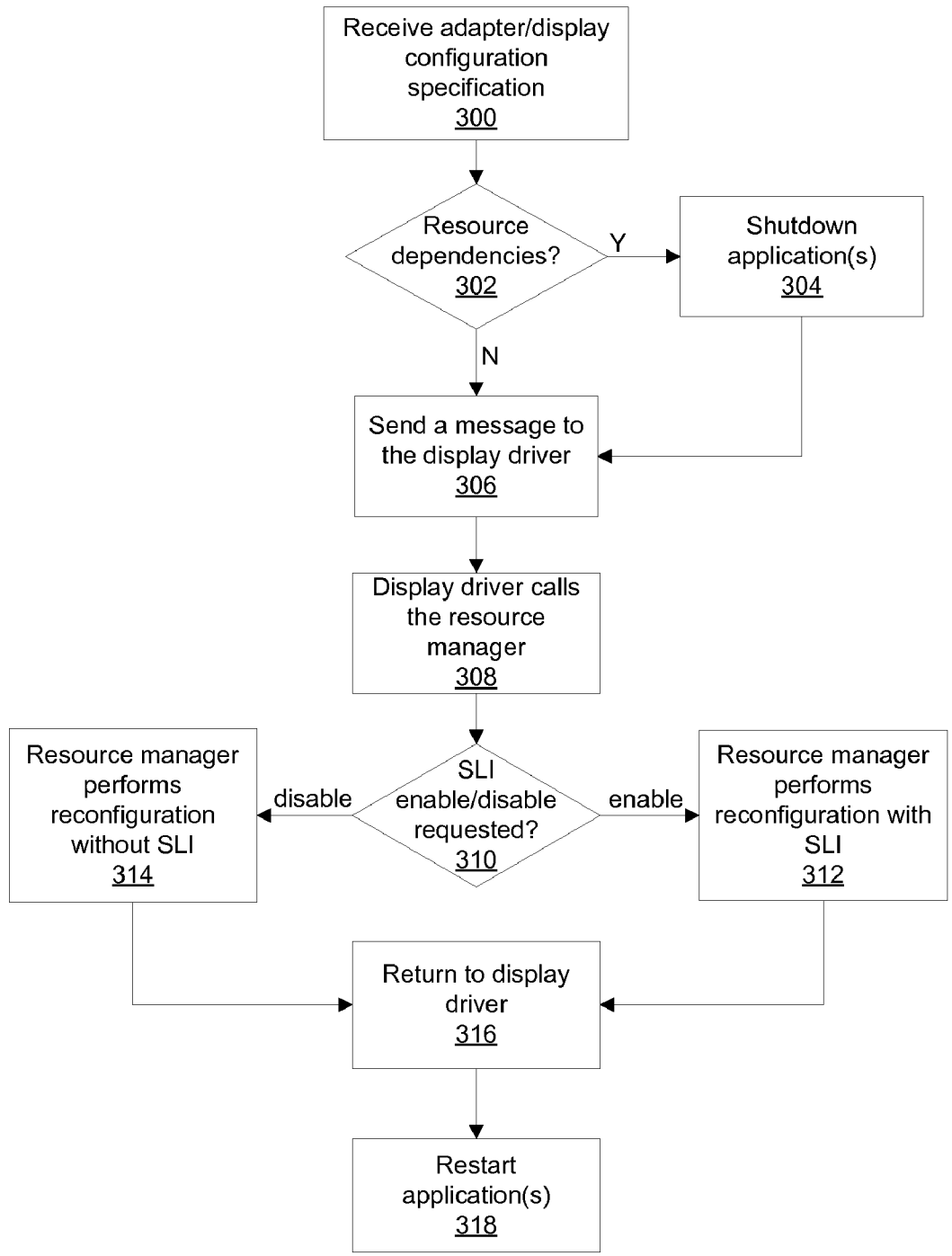
FIG. 3A is an exemplary embodiment of a method for dynamically changing the adapter/display configuration in accordance with one or more aspects of the present invention.
Figure 3B:
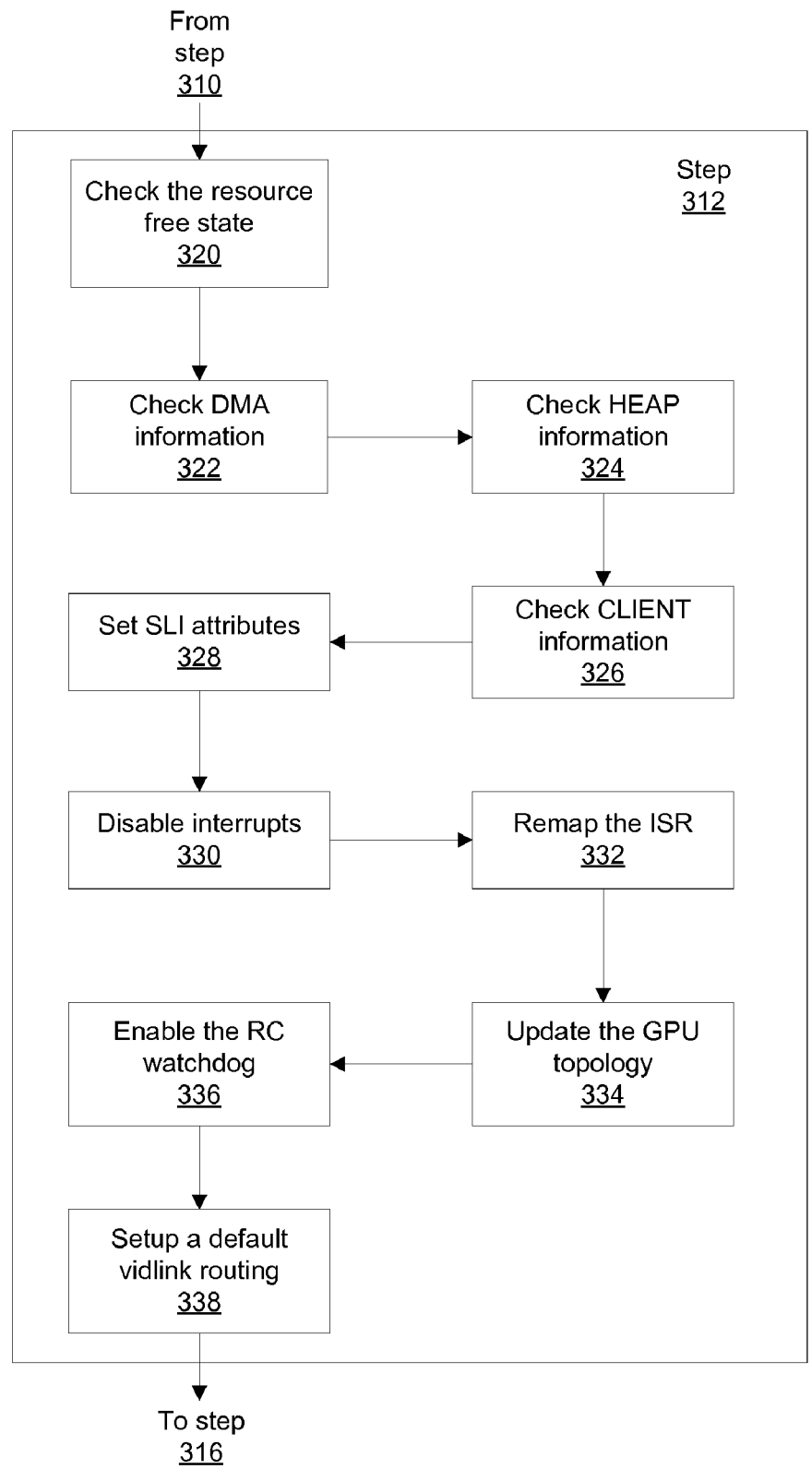
FIG. 3B is an exemplary embodiment of a method for performing step 312 shown in FIG. 3A in accordance with one or more aspects of the present invention.
Figure 3C:
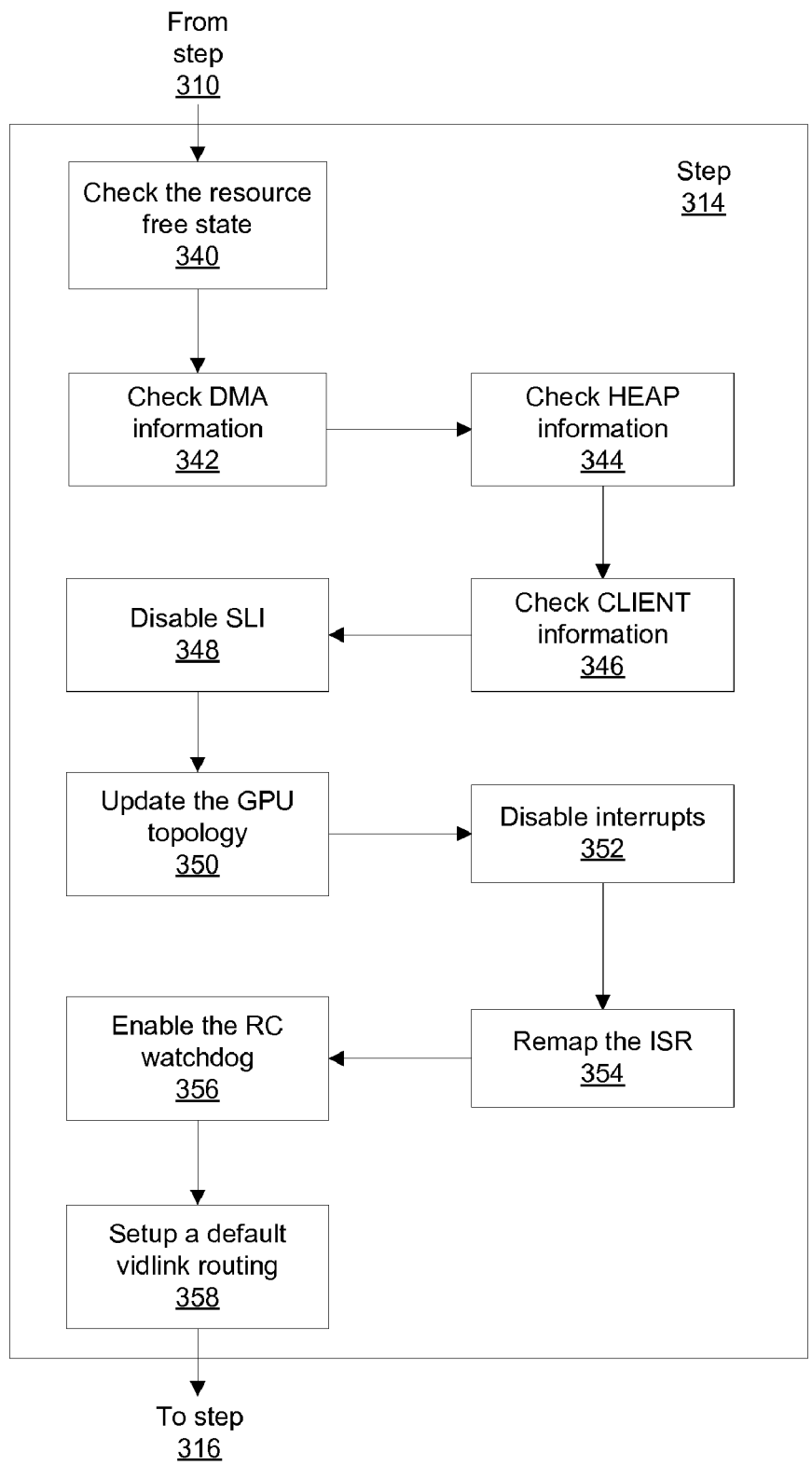
FIG. 3C is an exemplary embodiment of a method for performing step 314 shown in FIG. 3A in accordance with one or more aspects of the present invention.

Display driver 210 reconfigures system 100 according to the configuration specification by completing a teardown sequence and a rebuilding sequence, as described in conjunction with FIGS. 3A, 3B, and 3C. Display driver 210 includes a miniport 215 and a resource manager 220. Resource manager 220 includes a GPU manager 225 and performs the teardown and rebuilding sequences. Miniport 215 is known to those skilled in the art as a kernel-mode driver specific to graphics subsystem 180 that is linked to the operating system (OS). GPU manager 225 is a portion of display driver 210 that is dedicated to, but not limited to, managing creation/initialization/instantiation, topology, querying, linking/unlinking, state management, and destruction/detachment related to graphics subsystem 180. GPU manager 225 provides a central set of functionality for resources and provides a cohesive interface for communications with graphics subsystem 180.

FIG. 3A is an exemplary embodiment of a method for dynamically changing the adapter/display configuration, in accordance with one or more aspects of the present invention. In step 300 control panel 205 receives an adapter/display configuration specification. As previously described, control panel 205 is configured to receive user input defining a desired adapter/display configuration and control panel 205 may generate the configuration specification in response to user input. Alternatively, the configuration specification is generated by a graphics adapter as a result of a change in the physical connections within the multiple graphics adapter system, e.g., installation of a graphics adapter, removal of a graphics adapter, installation of a display device, removal of a display device, addition of an SLI connection, removal of an SLI connection, or the like.

In step 302 control panel 205 determines if there are any dependencies on the resources, e.g., graphics adapters and display devices, that will be reconfigured to implement the adapter/display configuration specification. If, in step 302 control panel 205 determines that there are no dependencies, then it proceeds directly to step 306. Otherwise, in step 304 control panel 205 shuts down any applications that are dependent on the resources. In step 306 control panel 205 sends a message to display driver 210 to initiate the adapter/display reconfiguration.

In step 308 display driver 210 calls resource manager 220 to implement the changes defined by the adapter/display configuration specification. In step 310 resource manager 220 determines if the configuration specification enables or disables an SLI connection, and, if an SLI connection is enabled, in step 312 resource manager 220 performs the reconfiguration with SLI enabled. If, in step 310 resource manager 220 determines that the configuration specification does disables an SLI connection, then in step 314 resource manager 220 performs the reconfiguration with SLI disabled. Steps 312 and 314 are described in conjunction with FIGS. 3B and 3C, respectively.

In step 316 resource manager 220 returns control back to display driver 210. In step 318 display driver 210 restarts any applications that were shutdown in step 304 and returns control back to the desktop. A user may then specify changes to produce a different adapter/display configuration or initiate changes by adding or removing a display device, graphics adapter, or SLI connection. Note that the reconfiguration is completed without shutting down system 100 and that the reconfiguration is not necessarily initiated by the OS. Therefore, a user may transition to and from configurations enabling or disabling SLI without suffering a reboot of system 100.

FIG. 3B is an exemplary embodiment of a method for performing step 312 shown in FIG. 3A, in accordance with one or more aspects of the present invention. In step 320 resource manager 220 checks the resource free state, confirming that the resources are freed, i.e., there are no dependencies. In steps 322, 324, and 326 resource manager 220 updates the topology of graphics adapters in the multiple graphics adapter system. Specifically, in step 322 resource manager 220 checks the DMA (direct memory access) information confirming that DMA resources are freed. In step 324 resource manager 220 checks the HEAP information to determine if there is a memory leak. In some embodiments of the present invention, driver 113 includes debugging capabilities and resource manager 220 causes an exception and driver 113 presents an alert message indicating that a memory leak occurred. In step 326 resource manager 220 checks the CLIENT information confirming that CLIENT resources are freed.

In steps 328, 330, and 332 resource manager 220 changes the adapter/display configuration of system 100. Specifically, in step 328 resource manager 220 enables the SLI attributes in graphics adapter 164 and 165 according to the configuration specification. In step 330 resource manager 220 disables interrupts to ensure that no interrupt processing happens during the actual transition to/from SLI. In step 332 resource manager 220 remaps the ISR (Interrupt Service Routine).

In steps 334, 336, and 338 resource manager 220 reloads the state information for graphics adapter 164 and 165. Specifically, in step 334 resource manager 220 updates the topology of graphics adapters 164 and 165 and the display devices, e.g., displays 170 and 172. When SLI is enabled, in step 334 resource manager 220 initializes graphics processor 150 and primary graphics processor 140 and reloads the state information. Specifically, in step 334 resource manager 220 attaches and creates a BC device to enable an SLI connection. In step 336 resource manager 220 enables the robust channels (RC) watchdog. The RC watchdog is a thread that checks to see if graphics processors 150 or primary graphics processor 140 is in a critical error state. When graphics processor 150 or primary graphics processor 140 RC watchdog may invoke RC to try and recover from the error. In step 338 resource manager 220 sets up a default vidlink routing. Vidlink is the physical link between devices for compositing output data output from multiple graphics processors, such as graphics processor 150 and primary graphics processor 140, for final display on display 170.

FIG. 3C is an exemplary embodiment of a method for performing step 314 shown in FIG. 3A, in accordance with one or more aspects of the present invention. In step 340 resource manager 220 checks the resource free state. In steps 342, 344, and 346 resource manager 220 updates the topology of graphics adapters in the multiple graphics adapter system, as described in conjunction with steps 322, 324, and 326 of FIG. 3B, respectively. In steps 348, 350, and 352 resource manager 220 changes the adapter/display configuration of system 100. Specifically, in step 348 resource manager 220 disables the SLI connections in graphics adapter 164 and 165 according to the configuration specification.

In step 350 resource manager 220 reloads the state information for graphics adapter 164 and 165, and detaches and destroys a BC device to disable an SLI connection. In step 352 resource manager 220 disables interrupts. In step 354 resource manager 220 remaps the ISR. In step 356 resource manager 220 disables the RC watchdog. In step 358 resource manager 220 removes a default vidlink routing. Persons skilled in the art will appreciate that any system configured to perform the method steps of FIG. 3A, 3B, or 3C, or their equivalents, is within the scope of the present invention.

A system and method for modifying the configuration of one or more graphics adapters without rebooting the system allows a user to quickly transition between different graphics adapter/display configurations. A single display driver interfaces between the operating system and the one or more graphics adapters. The display driver reconfigures the one or more graphics adapters to change the adapter/display configuration without shutting down or rebooting the system. Unlike a conventional system reboot performed by the operating system, the display driver checks that there are no memory leaks or error conditions during the reconfiguration. The display driver then unloads state information from the one or more graphics adapters and reloads state information according to the modified configuration.

While the foregoing is directed to embodiments of the present invention, other and further embodiments of the invention may be devised without departing from the basic scope thereof, and the scope thereof is determined by the claims that follow. Specifically, persons skilled in the art will recognize that the methods and systems described may be used for processing data other than graphics data where the data is used by processors in a multi-processing data processing system. The foregoing description and drawings are, accordingly, to be regarded in an illustrative rather than a restrictive sense. The listing of steps in method claims do not imply performing the steps in any particular order, unless explicitly stated in the claim.

All trademarks are the respective property of their owners.

Embodiments of the invention provide a computer readable medium storing instructions for causing a processor to change a configuration of a multiple graphics adapter processing system by performing the steps of determining whether a configuration specification enables or disables a scalable link interface between a first graphics adapter and a second graphics adapter in the multiple graphics adapter processing system, and changing between a first configuration of the first graphics adapter and the second graphics adapter and a second configuration of the first graphics adapter and the second graphics adapter without shutting down the multiple graphics adapter processing system, wherein the second configuration or the first configuration is defined by the configuration specification.

The invention claimed is:

1. A multiple graphics adapter processing system, comprising:
   a first display device;
   a second display device;
   a first graphics adapter configured to provide image data to the first display device;
   a second graphics adapter configurable to provide image data to the first display device through the first graphics adapter or to provide image data to the second display device; and
   a single display driver configured to interface to an operating system of the multiple graphics adapter processing system and to change a configuration of the first display device, the second display device, the first graphics adapter, and the second graphics adapter from a first configuration to a second configuration without shutting down the multiple graphics adapter processing system, wherein no intervening display drivers are present in a first communication path between the single display driver and the first graphics adapter, and wherein no intervening display drivers are present in a second communication path between the single display driver and the second graphics adapter.

2. The system of claim 1, wherein the second graphics adapter is configured to provide the image data to the first display device in the first configuration and a scalable link interface between the first graphics adapter and the second graphics adapter is disabled in the second configuration.

3. The system of claim 1, wherein the second graphics adapter is configured to provide the image data to the second display device in the first configuration and a scalable link interface between the first graphics adapter and the second graphics adapter is enabled in the second configuration allowing the second graphics adapter to provide image data to the first display device through the first graphics adapter.

4. The system of claim 1, wherein the single display driver is further configured to unload state information corresponding to the first configuration from the first graphics adapter.

5. The system of claim 1, wherein the single display driver is further configured to load state information corresponding to the second configuration into the first graphics adapter.

6. The system of claim 1, wherein the first graphics adapter is configured to provide image data to the second display device.

7. The system of claim 1, further comprising a control panel configured to receive a specification of the second configuration from a user.

8. The system of claim 1, wherein the single display driver is configured to determine if there is a memory leak in the multiple graphics adapter processing system.

9. A method of changing a configuration of a multiple graphics adapter processing system, comprising:
receiving a configuration specification for the multiple graphics adapter processing system;
sending a message to a single display driver to initiate reconfiguration of the multiple graphics adapter processing system that includes a first graphics adapter and a second graphics adapter, wherein no intervening display drivers are present in a first communication path between the single display driver and the first graphics adapter, and wherein no intervening display drivers are present in a second communication path between the single display driver and the second graphics adapter;
determining whether the configuration specification enables or disables a scalable link interface between a first graphics adapter and a second graphics adapter in the multiple graphics adapter processing system; and
changing from a first configuration of the first graphics adapter and the second graphics adapter to a second configuration of the first graphics adapter and the second graphics adapter without shutting down the multiple graphics adapter processing system, wherein the second configuration is defined by the configuration specification.

10. The method of claim 9, wherein the configuration specification is provided by a control panel configured to receive user input.

11. The method of claim 9, wherein the configuration specification is provided by the first graphics adapter or the second graphics adapter.

12. The method of claim 9, further comprising determining if there is a memory leak in the multiple graphics adapter processing system.

13. The method of claim 9, further comprising enabling the scalable link interface between the first graphics adapter and the second graphics adapter based on the configuration specification.

14. The method of claim 9, further comprising disabling the scalable link interface between the first graphics adapter and the second graphics adapter based on the configuration specification.

15. The method of claim 9, further comprising:
shutting down an application program that is dependent on the first graphics adapter before the changing from the first configuration to the second configuration; and
restarting the application program after the changing from the first configuration to the second configuration.

16. A computer readable medium storing instructions for causing a processor to change a configuration of a multiple graphics adapter processing system by performing the steps of:
sending a message to a single display driver to initiate reconfiguration of the multiple graphics adapter processing system that includes a first graphics adapter and a second graphics adapter, wherein no intervening display drivers are present in a first communication path between the single display driver and the first graphics adapter, and wherein no intervening display drivers are present in a second communication path between the single display driver and the second graphics adapter;
determining whether a configuration specification enables or disables a scalable link interface between a first graphics adapter and a second graphics adapter in the multiple graphics adapter processing system; and
changing between a first configuration of the first graphics adapter and the second graphics adapter and a second configuration of the first graphics adapter and the second graphics adapter without shutting down the multiple graphics adapter processing system, wherein the second configuration or the first configuration is defined by the configuration specification.

17. The computer readable medium of claim 16, wherein the first configuration specifies that the first graphics adapter provides image data to a first display device and the second graphics adapter provides image data to a second display device, and the second configuration specifies that the first graphics adapter provides image data to the first display device and the second graphics adapter provides image data to the first display device through the scalable link interface.

18. The computer readable medium of claim 17, wherein the second configuration specifies that the first graphics adapter provides image data to the second display device.

19. The computer readable medium of claim 16, further comprising determining if there is a memory leak in the multiple graphics adapter processing system.

20. The computer readable medium of claim 16, further comprising determining if there an error condition exists in the multiple graphics adapter processing system.

* * * * *